United States Patent
Jeong (10) Patent No.: US 9,195,322 B2
(45) Date of Patent: Nov. 24, 2015

(54) INPUT APPARATUS AND INPUT CONTROLLING METHOD THEREOF

(71) Applicant: Samsung Electronics Co., Ltd., Suwon-si (KR)

(72) Inventor: Ho-seong Jeong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/066,854

(22) Filed: Oct. 30, 2013

(65) Prior Publication Data

US 2014/0118253 A1      May 1, 2014

(30) Foreign Application Priority Data

Oct. 30, 2012   (KR) .................. 10-2012-0121595

(51) Int. Cl.
  *G06F 3/033*   (2013.01)
  *G06F 3/0346*  (2013.01)
  *G06F 3/0354*  (2013.01)

(52) U.S. Cl.
  CPC .......... *G06F 3/0346* (2013.01); *G06F 3/03545* (2013.01)

(58) Field of Classification Search
  CPC ....... G06F 3/011; G06F 3/033; G06F 3/0346; G06F 3/03545; G06F 3/04847
  See application file for complete search history.

(56) References Cited

U.S. PATENT DOCUMENTS

| | | | |
|---|---|---|---|
| 5,347,624 A | 9/1994 | Takanashi et al. | |
| 5,981,883 A * | 11/1999 | Shriver ................ | 178/18.01 |
| 6,906,703 B2 * | 6/2005 | Vablais et al. ............ | 345/179 |
| 8,396,684 B2 * | 3/2013 | Su et al. .................. | 702/151 |
| 8,907,931 B2 * | 12/2014 | Takatsuka .............. | 345/179 |
| 2003/0103239 A1 * | 6/2003 | Silverbrook et al. ....... | 358/1.18 |
| 2004/0128012 A1 | 7/2004 | Lin | |
| 2005/0103536 A1 | 5/2005 | Seytter | |
| 2006/0033712 A1 * | 2/2006 | Baudisch et al. ............ | 345/157 |
| 2006/0125845 A1 * | 6/2006 | Takeuchi et al. ............ | 345/619 |
| 2008/0018591 A1 | 1/2008 | Pittel et al. | |
| 2009/0167702 A1 * | 7/2009 | Nurmi ...................... | 345/173 |

(Continued)

FOREIGN PATENT DOCUMENTS

| | | |
|---|---|---|
| EP | 2098271 | 9/2009 |
| EP | 2219101 | 8/2010 |

(Continued)

OTHER PUBLICATIONS

Written Opinion of the International Searching Authority mailed Mar. 5, 2014 in International Patent Application No. PCT/KR2013/009748.

(Continued)

*Primary Examiner* — Joe H Cheng
(74) *Attorney, Agent, or Firm* — Staas & Halsey LLP (57) ABSTRACT

An input apparatus for controlling a display apparatus includes a communication unit; a sensing unit which senses movement of the input apparatus; a first input unit which receives a user input for defining a virtual input region which is to be used as an input region of the input apparatus; and a control unit which controls the communication unit to transmit location information corresponding to a location of the input apparatus to the display apparatus when the virtual input region that is defined according to the user input is mapped to a screen region of the display apparatus and the input apparatus is located in the mapped virtual input region.

32 Claims, 7 Drawing Sheets

(56) References Cited

U.S. PATENT DOCUMENTS

| | | |
|---|---|---|
| 2009/0262086 A1 | 10/2009 | Chen |
| 2010/0093435 A1 | 4/2010 | Glaser et al. |
| 2010/0231558 A1 | 9/2010 | Kwak |
| 2010/0234077 A1* | 9/2010 | Yoo et al. ............... 455/566 |
| 2010/0265175 A1 | 10/2010 | Kabasawa et al. |
| 2011/0292042 A1* | 12/2011 | Vaganov ............... 345/419 |
| 2011/0304537 A1* | 12/2011 | Eruchimovitch et al. .... 345/158 |
| 2012/0105488 A1* | 5/2012 | Kondo et al. ............ 345/676 |
| 2014/0104156 A1* | 4/2014 | Touma et al. ............ 345/156 |

FOREIGN PATENT DOCUMENTS

| | | |
|---|---|---|
| EP | 2228711 | 9/2010 |
| WO | 01/59975 A2 | 8/2001 |

OTHER PUBLICATIONS

International Search Report issued Mar. 5, 2014 in International Patent Application No. PCT/KR2013/009748.

Extended European Search Report dated Oct. 12, 2015 in European Application No. 13190927.7.

\* cited by examiner

INPUT APPARATUS AND INPUT CONTROLLING METHOD THEREOF

CROSS-REFERENCE TO RELATED APPLICATIONS

This application claims the priority benefit of Korean Patent Application No. 10-2012-0121595, filed on Oct. 30, 2012, in the Korean Intellectual Property Office, the disclosure of which is incorporated herein by reference in its entirety.

BACKGROUND

1. Field

The following description relates to an input apparatus and an input controlling method thereof, and more particularly, to an input apparatus for controlling a display apparatus and an input controlling method thereof.

2. Description of the Related Art

As electronics technology has advanced, various types of input apparatuses have been developed and have come into widespread use. In particular, input apparatuses based on advanced Information Technology (IT), such as a wired mouse, a wireless mouse, and a gyro wireless mouse, have become widely used.

The wired mouse refers to a mouse connected to a display apparatus, such as a personal computer (PC), via wire. The wireless mouse refers to a mouse that is wirelessly connected as an alternative to the wired mouse for a display apparatus, based on wireless communication technology. The gyro wireless mouse refers to a mouse using a gyroscope sensor.

However, the wireless mouse is substantially the same as the existing wired mouse, with the exception that it is wirelessly connected to a display apparatus. Thus, a mouse pad is used with the wireless mouse.

Because the gyro wireless mouse uses a gyroscope sensor, a mouse pad is not used with the gyro wireless mouse. However, in order to move a mouse pointer within a wide range, the gyro wireless mouse should be continuously moved to move the mouse pointer to a desired point.

Accordingly, users will be inconvenienced when using the conventional input apparatuses described above.

SUMMARY

Exemplary embodiments of the present disclosure may overcome the above disadvantages and other disadvantages not described above. However, the present disclosure is not required to overcome the disadvantages described above, and an exemplary embodiment of the present disclosure may not overcome any of the problems described above.

The following description relates to a method for controlling an input for a display apparatus. A user defines a virtual input region, using an input apparatus, as a shape created by selected points in a three-dimensional space. The movements of the input apparatus within the virtual space are then mapped to the display apparatus. Accordingly, a virtual input space can be positioned in a convenient location and orientation for a user, scaled to a convenient size for a user, defined with a convenient resolution for a user, and configured for a variety of different display apparatuses with different geometries and sizes.

The following description relates to an input apparatus for controlling a display apparatus using a virtual input region, by mapping the virtual input region to a screen region of the display apparatus, and an input controlling method thereof.

According to an embodiment of the present disclosure, an input apparatus for controlling a display apparatus includes a communication unit; a sensing unit which senses movement of the input apparatus; a first input unit which receives a user input for defining a virtual input region, which is to be used as an input region of the input apparatus; and a control unit which controls the communication unit to transmit location information corresponding to a location of the input apparatus to the display apparatus, when the virtual input region that is defined according to the user input is mapped to a screen region of the display apparatus and the input apparatus is located in the mapped virtual input region.

The virtual input region may allow a pointer to be located on the display apparatus to correspond to the location of the input apparatus in the virtual input region.

When a first user input is received at a first point on the input apparatus via the first input unit and a second user input is received at a second point on the input apparatus that is diagonally opposite the first point, the control unit may define a rectangular virtual input region, with the first point and the second point as vertices.

The control unit may change the mode of the input apparatus to a virtual input region defining mode when a first user input is received via the first input unit, and define a rectangular virtual input region, with a first point and a second point as vertices in the virtual input region defining mode, when the input apparatus is moved from the first point to the second point that is diagonally opposite the first point and the first user input is then received again at the second point via the first input unit.

The control unit may control the communication unit to transmit information regarding a resolution of the defined virtual input region to the display apparatus. The mapping of the virtual input region to the screen region of the display apparatus may be performed by the display apparatus, based on the information regarding the resolution.

The location information may be the same as location information in the mapped virtual input region in which the input apparatus is located.

The communication unit may receive information regarding a resolution of the display apparatus from the display apparatus. The control unit may compare the information regarding the resolution of the display apparatus with information regarding a resolution of the defined virtual input region, calculate a ratio between the resolution of the display apparatus and the resolution of the defined virtual input region, and perform the mapping of the virtual input region to the screen region of the display apparatus, based on the calculated ratio.

The location information may be the same as location information in the screen region of the display apparatus, which is mapped to the location information regarding the location of the input apparatus.

The defined virtual input region may be a plane in a three-dimensional space.

The input apparatus may further include a second input unit via which a user input instruction to adjust a resolution of the defined virtual input region is received.

According to an aspect of the present disclosure, an input controlling method of an input apparatus for a display apparatus includes receiving a user input instruction to define a virtual input region that is to be used as an input region of the input apparatus; and when the virtual input region that is defined according to the user input is mapped to a screen region of the display apparatus and the input apparatus is then located in the mapped virtual input region, transmitting location information corresponding to the location of the input apparatus to the display apparatus.

The virtual input region may allow a pointer to be located on the display apparatus to correspond to the location of the input apparatus in the virtual input region.

The receiving of the user input may include receiving a first user input at a first point on the input apparatus; and receiving a second user input at a second point on the input apparatus that is diagonally opposite the first point. When the first and second user inputs are received, the method may further include defining a rectangular virtual input region, with the first and second points as vertices.

The receiving of the user input may include receiving a first user input instruction to change the mode of the input apparatus to a virtual input region defining mode; and after the input apparatus is moved from a first point to a second point that is diagonally opposite the first point in the virtual input region defining mode, receiving the first user input again at the second point via an input unit. When the first user input is received again at the second point via the input unit, the method may further include defining a rectangular virtual input region, with the first and second points as vertices.

The method may further include transmitting information regarding a resolution of the defined virtual input region to the display apparatus. The mapping of the virtual input region to the screen region of the display apparatus may be performed by the display apparatus, based on the information regarding the resolution.

The location information may be the same as location information in the mapped virtual input region in which the input apparatus is located.

The method may further include receiving information regarding a resolution of the display apparatus from the display apparatus; comparing the information regarding the resolution of the display apparatus with information regarding a resolution of the defined virtual input region; and calculating a ratio between the resolution of the display apparatus and the resolution of the defined virtual input region. The mapping of the virtual input region to the screen region of the display apparatus may be performed by the input apparatus, based on the calculated ratio.

The location information may be the same as location information in the screen region of the display apparatus, which is mapped to the location information regarding the location of the input apparatus.

The defined virtual input region may be a plane in a three-dimensional space.

The method may further include receiving a user input instruction to adjust a resolution of the defined virtual input region.

According to an aspect of the present disclosure, a virtual display input system may include a display apparatus; and an input apparatus including: a communication unit; a sensing unit which senses movement of the input apparatus; a first input unit which receives a user input for defining a virtual input region which is to be used as an input region of the input apparatus; and a control unit which controls the communication unit to transmit location information corresponding to a location of the input apparatus to the display apparatus, when the virtual input region that is defined according to the user input is mapped to a screen region of the display apparatus and the input apparatus is located in the mapped virtual input region.

According to an aspect of the present disclosure, a method for controlling a location of a displayed pointer on a display screen may include selecting, using an input apparatus, a first coordinate point; selecting, using the input apparatus, a second coordinate point; defining a virtual input region based on the first coordinate point and the second coordinate point; tracking the location of the input apparatus in the virtual region; mapping the virtual input region to a region of the display screen; and controlling the location of the displayed pointer on the display screen based on the tracked location of the input apparatus in the mapped virtual region.

According to an aspect of the present disclosure, a method for defining a virtual input region of an input apparatus may include selecting, using the input apparatus, a first coordinate point; and defining, by a processor, a virtual input region based on at least the first coordinate point.

According to the various embodiments of the present disclosure described above, an input apparatus may be embodied as a wireless input apparatus, thereby increasing the portability of the input apparatus.

Also, according to the various embodiments of the present disclosure, a need for a mouse pad for using an input apparatus may be removed, thereby increasing the portability of the input apparatus and alleviating limitations to an environment in which the input apparatus is used.

Also, according to the various embodiments of the present disclosure, when a mouse pointer is to be moved within a wide range, an input apparatus may be located on a specific location in a virtual input region without having to continuously move the input apparatus in order to move a mouse pointer to a desired location, thereby increasing user convenience.

Also, according to the various embodiments of the present disclosure, a resolution of a virtual input region can be easily adjusted based on a user environment.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects of the present invention will be more apparent by describing certain exemplary embodiments of the present invention with reference to the accompanying drawings, in which:

FIG. 4 parts (a), (b), (c), and (d) illustrate methods of defining a virtual input region consistent with exemplary embodiments of the present disclosure;

FIG. 5 parts (a) and (b) illustrate an input method using a virtual input region consistent with an exemplary embodiment of the present disclosure;

FIG. 6 parts (a) and (b) illustrate a process of projecting location information onto a defined virtual input region consistent with an exemplary embodiment of the present disclosure.

DETAILED DESCRIPTION

Certain exemplary embodiments of the present disclosure will now be described in greater detail with reference to the accompanying drawings.

In the following description, the same drawing reference numerals are used for the same elements in different drawings. The matters defined in the description, such as detailed construction and elements, are provided to assist in a comprehensive understanding of the disclosure. Thus, it is apparent that the exemplary embodiments of the present disclosure can be carried out without those specifically defined matters. Also, well-known functions or constructions are not described in detail because they would obscure the disclosure with unnecessary detail.

Figure 1:
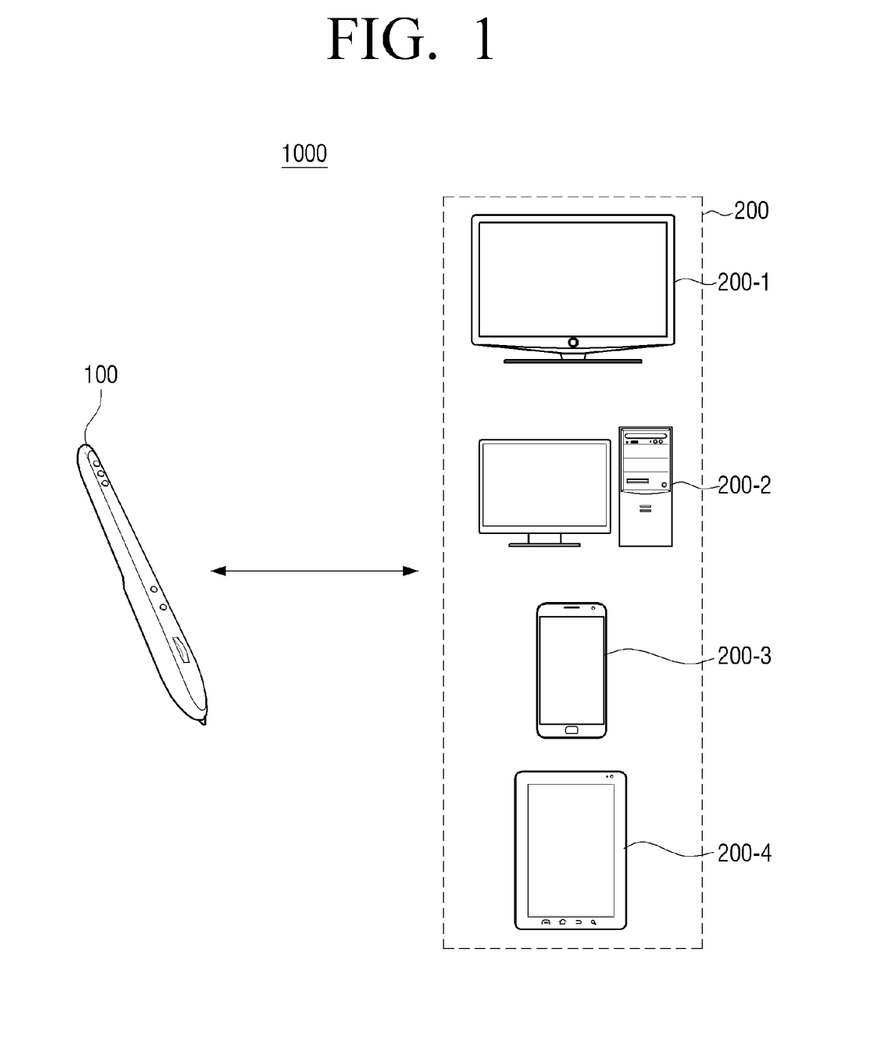
FIG. 1 is a diagram illustrating an input system consistent with an exemplary embodiment of the present disclosure.

FIG. 1 is a diagram illustrating an input system 1000 according to an embodiment of the present disclosure. Referring to FIG. 1, the input system 1000 includes an input apparatus 100 and a display apparatus 200.

The input apparatus 100 may be used to receive a user input instruction to define a virtual input region that is to be used as an input region of the input apparatus 100.

Also, the input apparatus 100 may define the virtual input region corresponding to the user input. The defined virtual input region may be a plane in a three-dimensional (3D) space, in which when the input apparatus 100 is moved, a mouse pointer marked on the display apparatus 200 may be moved to correspond to the movement of the input apparatus 100.

Also, when the defined virtual input region is mapped to a screen region of the display apparatus 200 and the input apparatus 100 is located in the mapped virtual input region, the input apparatus 100 may transmit location information corresponding to the location of the input apparatus 100 to the display apparatus 200.

Here, the mapping of the defined virtual input region to the screen region refers to mapping the location information in the defined virtual input region to location information corresponding to the location of the input apparatus 100 in the screen region of the display apparatus 200. This mapping may be performed by comparing information regarding a resolution of the defined virtual input region with information regarding a resolution of the display apparatus 200 by using the input apparatus 100 or the display apparatus 200.

When the display apparatus 200 receives the location information, the display apparatus 200 may mark a mouse pointer on a location thereof corresponding to the received location information.

The input apparatus 100 may be embodied as a mouse that may be used for controlling the display apparatus 200. In this case, the mouse may be embodied as a pen mouse, for example.

The display apparatus 200 may be embodied as a digital television (TV) 200-1, a desktop personal computer (PC) 200-2, a smart phone 200-3, or a tablet PC 200-4, for example. However, the present disclosure is not limited thereto, and the display apparatus 200 may be embodied as any of other various devices including a display, such as a notebook computer, a personal digital assistant (PDA), a portable multimedia player (PMP), or a navigation system, for example.

Additionally, although FIG. 1 illustrates display apparatuses with rectangular displays, the disclosure is not limited thereto. For example, a display apparatus may include a display screen with a diamond shape, a circular shape, a triangular shape, or another polygon. The display apparatus may be operated in a portrait mode or a landscape mode. Accordingly, the shape of the virtual input region may correspond to the shape of the display screen, may correspond to a portion of a display screen, or may correspond to a region larger than the display screen.

Furthermore, the display apparatus may be a three-dimensional screen, or a two-dimensional screen with a three-dimensional display. Accordingly, the virtual input region may be defined as a three-dimensional shape mapped to the three-dimensional display.

The input apparatus 100 may be operated in one of a virtual input region defining mode for defining a virtual input region, a mouse pointer mode for controlling movement of a mouse pointer marked on the display apparatus 200, and a laser beam emitting mode for emitting a laser beam.

Figure 2:
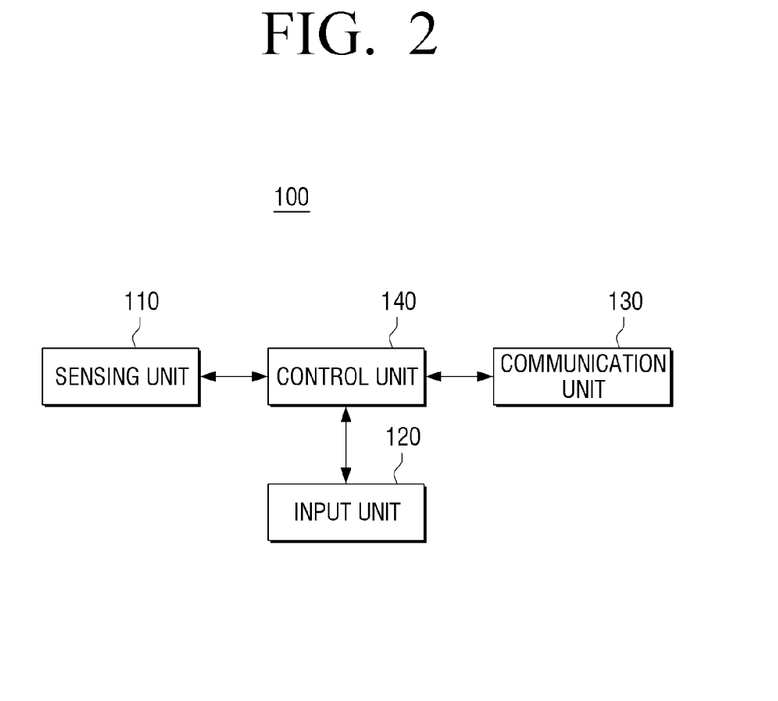
FIG. 2 is a block diagram of an input apparatus consistent with an exemplary embodiment of the present disclosure.

FIG. 2 is a block diagram of an input apparatus 100 according to an embodiment of the present disclosure. Referring to FIG. 2, the input apparatus 100 may include at least some of a sensing unit 110, an input unit 120, a communication unit 130, and a control unit 140.

The sensing unit 110 may sense movement of the input apparatus 100. Also, the sensing unit 110 may output a signal corresponding to a result of sensing the movement of the input apparatus 100 to the control unit 140.

The sensing unit 110 may be embodied as a gyro sensor that senses angular acceleration, an acceleration sensor that senses acceleration, or a combination thereof.

The gyro sensor may sense angular accelerations in an x-axis, a y-axis, and a z-axis, and output signals corresponding to results of sensing the angular accelerations to the control unit 140. In this case, the signals may contain information regarding the angular accelerations in the x-axis, the y-axis, and the z-axis. The control unit 140 may perform double integration on the information regarding the angular accelerations to calculate current location information regarding the input apparatus 100 in the x-axis, the y-axis, and the z-axis with respect to a reference point.

The acceleration sensor may sense accelerations in the x-axis, the y-axis, and the z-axis, and output signals corresponding to results of sensing the accelerations to the control unit 140. In this case, the signals may contain information regarding the accelerations. The control unit 140 may perform double integration on the information regarding the accelerations to calculate current location information regarding the input apparatus 100 in the x-axis, the y-axis, and the z-axis with respect to a reference point.

The input unit 120 receives a user input to the input apparatus 100. The input unit 12 may include a first input unit for receiving a user input instruction to define a virtual input region, and a second input unit for adjusting a resolution of the defined virtual input region. The input unit 120 may further include an input unit for receiving a user input instruction to perform a 'page up' function, an input unit for receiving a user input instruction to perform a 'page down' function, an input unit for receiving a user input instruction to activate a laser beam pointer, an input unit for receiving a user input instruction to perform a left button function of a mouse, an input unit for receiving a user input instruction to perform a right button function of the mouse, and an input unit for receiving a user input instruction to perform a scroll wheel function.

The input unit 120 may be embodied as a touch sensor. The touch sensor may an electrostatic type touch sensor or a pressure-sensitive type touch sensor, for example.

Thus, when a touch input is received from a user, the input unit 120 may deliver an electrical signal corresponding to a touched location to the control unit 140 and the control unit 140 may recognize the touched location by using coordinates at which the electrical signal is delivered.

Also, the input unit 120 may be embodied as a microphone. A voice command from a user is input to the microphone. The input unit 120 transforms the input voice into an electrical signal and delivers the electrical signal to the control unit 140. In this case, the control unit 140 may recognize a user input corresponding to the input voice, based on the electrical signal.

Also, the input unit 120 may be embodied as a button or a pressure sensor. The pressure sensor may include a piezo film for outputting an electrical signal corresponding to pressure. Thus, when a user input is received using the input unit 120 which is the button, the input unit 120 delivers an electrical signal corresponding to a pressure applied to a location on the input unit 120 via which the user input is received, to the control unit 140. The control unit 140 may recognize that the button is selected, based on the electrical signal.

Here, the input unit 120 may include at least one of the above-described devices capable of receiving a user input. Accordingly, the input unit 120 may receive a user input that is input to the input apparatus 100.

For convenience of explanation, an input unit according to an embodiment of the present disclosure will now be described in detail with reference to FIG. 3.

Figure 3:
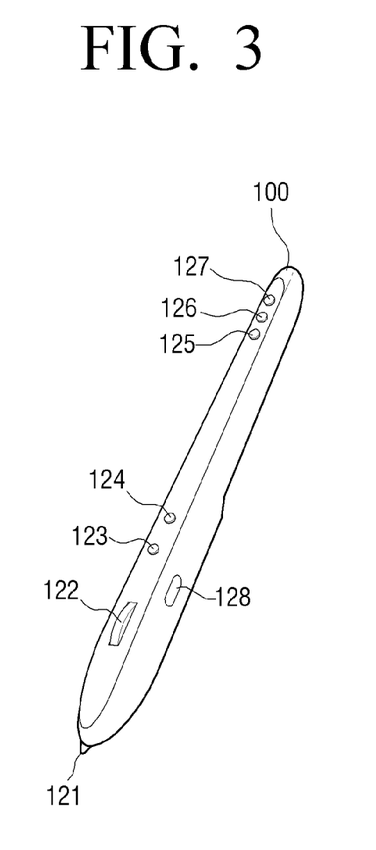
FIG. 3 is a diagram illustrating a shape of an input apparatus consistent with an exemplary embodiment of the present disclosure.

FIG. 3 is a diagram illustrating a shape of an input apparatus 100 according to an embodiment of the present disclosure. Referring to FIG. 3, the input apparatus 100 may be embodied as a pen mouse.

An input unit 120 of the input apparatus 100 includes an input unit 121 for receiving a user input instruction to perform a left button function of a mouse, an input unit 122 for receiving a user input instruction to perform a scroll wheel function, a first input unit 123 for receiving a user input instruction to define a virtual input region, a second input unit 124 for receiving a user input instruction to adjust a resolution of the defined virtual input region, an input unit 125 for receiving a user input instruction to activate a laser beam pointer, an input unit 126 for receiving a user input instruction to perform a 'page down' function, an input unit 127 for receiving a user input instruction to perform a 'page up' function, and an input unit 128 for receiving a user input instruction to a right button function of the mouse.

Here, the input unit 121 may be embodied as a point of a pen, and may perform a function that is substantially the same as a left button function of a mouse, when a force is applied to press the input apparatus 100 against a surface, for example.

The input unit 122 may be embodied as a scroll wheel and may perform a function that is substantially the same as a wheel key of a mouse.

The input units 123 to 128 may be embodied as buttons. In this case, when the buttons are pressed or released, functions corresponding thereto may be performed. In particular, the second input unit 124 may include a (+) region for receiving a user input instruction to increase a resolution and a (−) region for receiving a user input instruction to lower a resolution.

Although FIG. 3 illustrates that the input units 121 to 128 are button type input units, the present disclosure is not limited thereto and the input units 121 to 128 may be embodied according to any of other various methods, such as a touch-based method or a voice recognition method, for example.

Also, an arrangement of the input units 121 to 128 is not limited to that shown in FIG. 3, and the input units 121 to 128 may be arranged in any of various manners according to a user's convenience.

The communication unit 130 allows the input apparatus 100 to establish communication with the display apparatus 200.

In particular, when the display apparatus 200 performs a mapping operation, the communication unit 130 may transmit information regarding a resolution of the defined virtual input region to the display apparatus 200. In this case, the display apparatus 200 may map the defined virtual input region to a screen region thereof, based on the information regarding the resolution of the defined virtual input region. When the input apparatus 100 is located in the mapped virtual input region in a state that the mapping operation of the display apparatus 200 is completed, the communication unit 130 may transmit location information corresponding to the location of the input apparatus 100 in the mapped virtual input region to the display apparatus 200.

If the input apparatus 100 is capable of receiving the information regarding a resolution of the display apparatus 200, the input apparatus 100 may perform such a mapping operation. In this case, the input apparatus 100 may map the defined virtual input region to the screen region of the display apparatus 200, based on the information regarding the resolution of the display apparatus 200. When the input apparatus 100 is located in the mapped virtual input region in a state in which the mapping operation of the input apparatus 100 is completed, the communication unit 130 may transmit location information regarding the screen region of the display apparatus 200 mapped to location information regarding the location of the input apparatus 100 in the mapped virtual input region, to the display apparatus 200.

The communication unit 130 may be connected to a device via wire through a universal serial bus (USB) port, a serial port, or a mouse port, according to a 2.4 GHz digital wireless method or according to a near-field communication method, e.g., infrared data association (IrDA), Blue Tooth, near-field communication (NFC), radio-frequency identification (RFID), or Zigbee.

In particular, when the input apparatus 100 is embodied as a wireless input apparatus, the portability of the input apparatus 100 may be increased.

The control unit 140 controls overall operations of the input apparatus 100. Specifically, the control unit 140 may control at least some of the sensing unit 110, the input unit 120, and the communication unit.

In particular, the control unit 140 may calculate current location information of the input apparatus 100, based on a signal received from the sensing unit 110. In this case, the control unit 140 may correct the calculated current location information in consideration of location of the sensing unit 110 attached to the input apparatus 100. For example, when the input apparatus 100 is embodied as a pen mouse, a user would be interested in the location of a writing portion of the pen mouse, i.e., a pen tip, rather than the location of the sensing unit 110 attached to the input apparatus 100. For example, if the sensing unit 110 is spaced by +1 cm in a z-axis direction and −0.5 cm in an x-axis direction from the writing portion of the pen mouse, the control unit 140 may process the calculated current location information to be corrected by −1 cm in the z-axis direction and +0.5 cm in the x-axis direction.

Also, the control unit 140 may define a virtual input region according to a user input received via the first input unit 123.

Specifically, when the control unit 140 receives a first user input at a first point on the input apparatus 100 and a second user input at a second point on the input apparatus 100, which is diagonally opposite the first point, via the first input unit 123, the control unit 140 may define a rectangular virtual input region with the first and second points as vertices. Here, the first and second user inputs may vary according to the shape of the first input unit 123. For example, when the first input unit 123 is embodied as a button, the first user input may be maintaining pressing of the button and the second user input may be releasing the button. When the first input unit 123 is embodied as a touch sensor, the first user input may be maintaining touching of the button and the second user input may be cancelling the touching the button. When the input unit 120 is embodied as a microphone, the first user input may be uttering the word 'start' and the second user input may be uttering the word 'end'.

Otherwise, when the first user input is received via the first input unit 123, the control unit 140 may change the mode of the input apparatus 100 to a virtual input region defining mode. In the virtual input region defining mode, when the input apparatus 100 is moved from the first point to the second point that is diagonally opposite the first point and the first user unit is received again at the second point via the first input unit 123, the control unit 140 may define a rectangular virtual input region with the first and second points as vertices. Here, the first user input may vary according to the shape of the first input unit 123. For example, if the first input unit 123 is embodied as a button, the first user input may be pressing the button and then releasing the button. When the first input unit 123 is embodied as a touch sensor, the first user input may be touching the button and then releasing the touching of the button. When the input unit 120 is embodied as a microphone, the first user input may be uttering the wording 'virtual input region defining mode'.

The control unit 140 may define the rectangular virtual input region with the first and second points as vertices, based on first location information calculated at the first point and second location information calculated at the second point that is diagonally opposite the first point, as will be described in detail with reference to FIG. 4 below.

Figure 4:
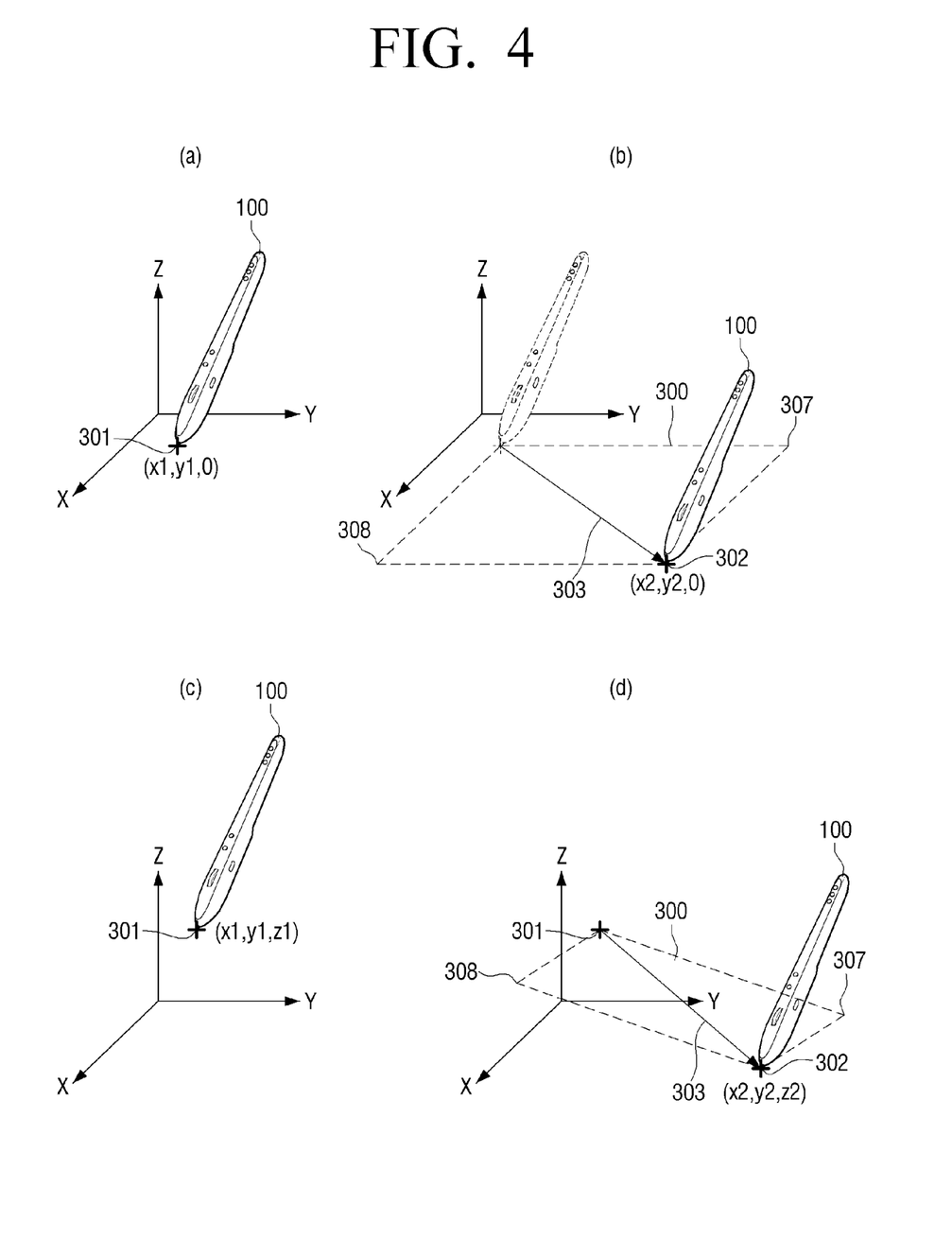

FIG. 4 illustrates methods of defining a virtual input region 300 according to embodiments of the present disclosure. Referring to FIG. 4 part (a), when a user places an input apparatus 100 at a first point on a virtual input region that is to be defined, the control unit 140 may calculate first location information (x1, y1, 0) 301 at a first point on the input apparatus 100. Referring to FIG. 4 part (b), when the user places the input apparatus 100 at a second point on the virtual input region that is to be defined, by moving the input apparatus 100 along a travel path 303, the control unit 140 may calculate second location information (x2, y2, 0) 302 at a second point on the input apparatus 100, which is diagonally opposite the first point. In this case, location information of two vertices of a rectangle that are diagonally opposite each other is calculated. Thus, the control unit 140 may automatically calculate third location information (x1, y2, 0) 307 and fourth location information (x2, y1, 0) 308 of the other vertices of the rectangle. Then, the control unit 140 may define a rectangular virtual input region, the vertices of which are the first location information (x1, y1, 0) 301, the second location information (x2, y2, 0) 302, the third location information (x1, y2, 0) 307, and the fourth location information (x2, y1, 0) 308. Although the travel path 303 is illustrated as a straight line path, the present disclosure is not limited thereto. For example, the travel path may be a curved path.

Referring to FIG. 4 part (c), when a user places the input apparatus 100 at a first point on a virtual input region that is to be defined, the control unit 140 may calculate first location information (x1, y1, z1) 301 at a first point on the input apparatus 100. Then, referring to FIG. 4 part (d), when the user places the input apparatus 100 at a second point on the virtual input region that is to be defined, by moving the input apparatus 100 along a travel path 303, the control unit 140 may calculate second location information (x2, y2, z2) 302 at a second point on the input apparatus 100, which is diagonally opposite the first point.

In this case, the control unit 140 may automatically calculate third location information (x3, y3, z2) 307 in which location information in the z-axis is the same as that of the second location information (x2, y2, z2) 302, and location information in the x-axis and location information in the y-axis of which are different from those of the second location information (x2, y2, z2) 302. Also, the control unit 140 may automatically calculate fourth location information (x4, y4, z1) 308 in which location information in the z-axis is the same as that of the first location information (x1, y1, z1) 301, and location information in the x-axis and location information in the y-axis are different from those of the first location information (x1, y1, z1) 301. Then, the control unit 140 may define a rectangular virtual input region, the vertices of which are the first location information (x1, y1, z1) 301, the second location information (x2, y2, z2) 302, the third location information (x3, y3, z2) 307, and the fourth location information (x4, y4, z1) 308.

In other words, as illustrated in FIG. 4, the control unit 140 may define a rectangular virtual input region by using the calculated first location information and second location information, based on the features of a rectangle.

However, the present disclosure is not limited thereto, and a first point, a second point, a third point, and a fourth point may be determined by a user. In this case, the control unit 140 may define a rectangular virtual input region with the first to fourth points as vertices. That is, the virtual input region may be defined to a rectangular plane within a 3D space. Also, the control unit may define a rectangular virtual input region using the first location information as a midpoint of a left side of the rectangular virtual input region and the second location information as a midpoint of a right side of the rectangular virtual input region.

Furthermore, the virtual input region may be defined by a single point selected by a user and a predetermined virtual input region size. For example, a virtual input region may be defined as a rectangle with a predetermined size oriented in an orthogonal direction with respect to an axis of the input apparatus, and with a center point as the point selected by the user with the input apparatus. The predetermined size may be equal to the size of the display, or half the size of the display, for example. Accordingly, a virtual input region may be defined with a single point.

The control unit 140 may set the defined virtual input region to have a preset resolution or to have a resolution that is set according to a user input received via the second input unit.

Here, the term 'resolution' refers to the density of location information in the defined virtual input region. For convenience of explanation, a case in which the defined virtual input region is a rectangle, the vertices of which are first location information (0, 0, 0), second location information (10, 10, 0), third location information (0, 10, 0), and fourth location information (10, 0, 0) will be described. In this case, because the defined virtual input region has a resolution of 100×100, ten thousand pieces of location information, including the first location information (0, 0, 0), the second location information (10, 10, 0), the third location information (0, 10, 0), and the fourth location information (10, 0, 0), are included in the rectangular shape of the virtual input region.

When a virtual input region is defined, the input apparatus 100 or the display apparatus 200 may map the defined virtual input region to a screen region of the display apparatus 200.

A mapping operation may be performed by the input apparatus 100 as described below.

Specifically, when the input apparatus 100 is capable of receiving information regarding a resolution of the display apparatus 200, the control unit 140 may compare the information regarding the resolution of the display apparatus 200 with information regarding a resolution of a defined virtual input region so as to calculate a ratio between the resolution of the display apparatus 200 and the resolution of the defined virtual input region, and then perform mapping based on the calculated ratio.

For convenience of explanation, a case in which the defined virtual input region has a resolution of 100×100 and the display apparatus 200 has a resolution of 1000×1000 will be described. In this case, the control unit 140 may calculate the ratio between the resolution of the display apparatus 200 and the resolution of the defined virtual input region, e.g., width:height=1:10. Then, the control unit 140 may calculate location information (x1', y1', z1') in a screen region of the display apparatus 200 corresponding to location information (x1, y1, z1) in the defined virtual input region, based on the calculated ratio. Thus, the control unit 140 may perform mapping such that the location information (x1, y1, z1) in the defined virtual input region and the location information (x1', y1', z1') in the screen region of the display apparatus 200 correspond to each other (one-to-one correspondence).

Such a mapping operation may also be performed by the display apparatus 200. In this case, the control unit 140 may control the communication unit 130 to transmit information regarding a resolution of a defined virtual input region to the display apparatus 200. Then, the display apparatus 200 may map the defined virtual input region to a screen region of the display apparatus 200, based on the information regarding the resolution of the defined virtual input region.

When the defined virtual input region is mapped to the screen region of the display apparatus 200 and the input apparatus 100 is then placed in the mapped virtual input region, the control unit 140 may control the communication unit 130 to transmit location information corresponding to the location of the input apparatus 100 to the display apparatus 200.

Specifically, when the input apparatus 100 performs the mapping operation, the control unit 140 may control the communication unit 130 to transmit location information in a screen region of the display apparatus 200 mapped to location information of the input apparatus 100 placed in a virtual input region, to the display apparatus 200. In this case, the display apparatus 200 may mark a mouse pointer on the location on the screen region corresponding to the location information in the screen region of the display apparatus 200.

When the display apparatus 200 performs the mapping operation, the control unit 140 may control the communication unit 130 to transmit location information of the input apparatus 100 placed in a virtual input region to the display apparatus 200. In this case, the display apparatus 200 may detect location information in a screen region thereof mapped to the location information in the virtual input region, and mark a mouse pointer on the location on the screen region corresponding to the detected location information in the screen region.

Figure 5:
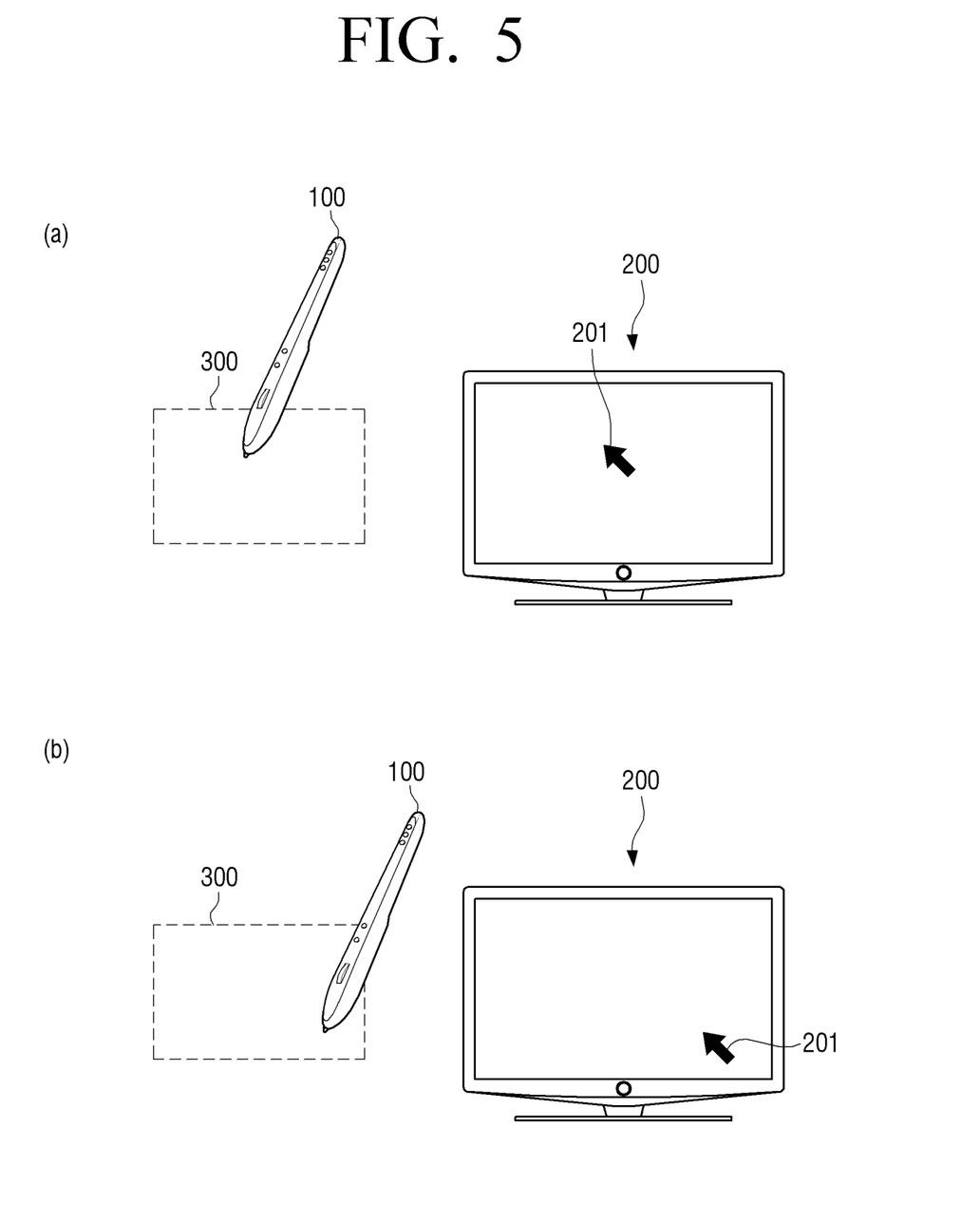

The mapping operation will now be described in detail with reference to FIG. 5. FIG. 5 illustrates an input method using a virtual input region according to an embodiment of the present disclosure. Referring to FIG. 5 part (a), when an input apparatus 100 is placed in a mapped virtual input region 300, a mouse pointer may be marked on a location 201 on a screen region of the display apparatus 200, which is mapped to the location of the input apparatus 100 in the mapped virtual input region 300. When the input apparatus 100 is moved in the mapped virtual input region 300 as illustrated in FIG. 5 part (b), the mouse pointer may be marked on a location 201 on the screen region of the display apparatus 200, which is mapped to the location of the input apparatus 100.

According to various embodiments of the present disclosure as described above, a virtual input region and a screen region of a display apparatus are mapped to each other, so that a mouse pad for using an input apparatus may not be used, thereby increasing the portability of the display apparatus and alleviating limitations to an environment in which the display apparatus is used. Also, when a mouse pointer is to be moved within a wide range, the input apparatus may be continuously moved to a specific location on a virtual input region without having to move the mouse pointer, thereby increasing user convenience.

Also, according to various embodiments of the present disclosure as described above, a resolution of a virtual input region may be easily adjusted according to a user environment. For example, in order to select a menu displayed on a display apparatus, an input apparatus does not need to be precisely moved. Thus, the resolution of the virtual input region is lowered to easily select the menu with the input apparatus. When a detailed picture is drawn using the input apparatus, the input apparatus needs to be precisely moved. Thus, the resolution of the virtual input region is increased to precisely draw a desired picture with the input apparatus.

The size of the virtual input region may correspond directly to the size of the display screen, may be smaller than the display screen, or may be larger than the display screen. As an example, a 42 inch widescreen television display screen may have a width of 39.3 inches and a height of 29.7 inches. A virtual input region may be defined as a rectangle with a width of 13.1 inches and a height of 9.9 inches. The virtual input region may be mapped to the display screen such that a movement of 1 inch by the input apparatus on the virtual input region correlates to a movement of 3 inches by a mouse pointer displayed on the display screen.

As an example, the resolution of the virtual input region may be set such that the precision of the tracking of the movement of the input apparatus is set to 0.1 inches. Accordingly, an actual 4.36 inch movement of the input apparatus in the virtual input region may be tracked as a 4.4 inch movement in the virtual input region. If the resolution is changed to a 1.0 inch resolution, the 4.36 inch movement in the virtual input region may be tracked as a 4 inch movement in the virtual input region.

When location information calculated at current location of the input apparatus 100 is not the same as location information in the virtual input region, the control unit 140 may calculate location information obtained by projecting the location information calculated at the current location of the input apparatus 100 onto the virtual input region. In this case, the display apparatus 200 may mark a mouse pointer on a location on the screen region corresponding to the projected location information, as will be described in detail with reference to FIG. 6 below.

Figure 6:
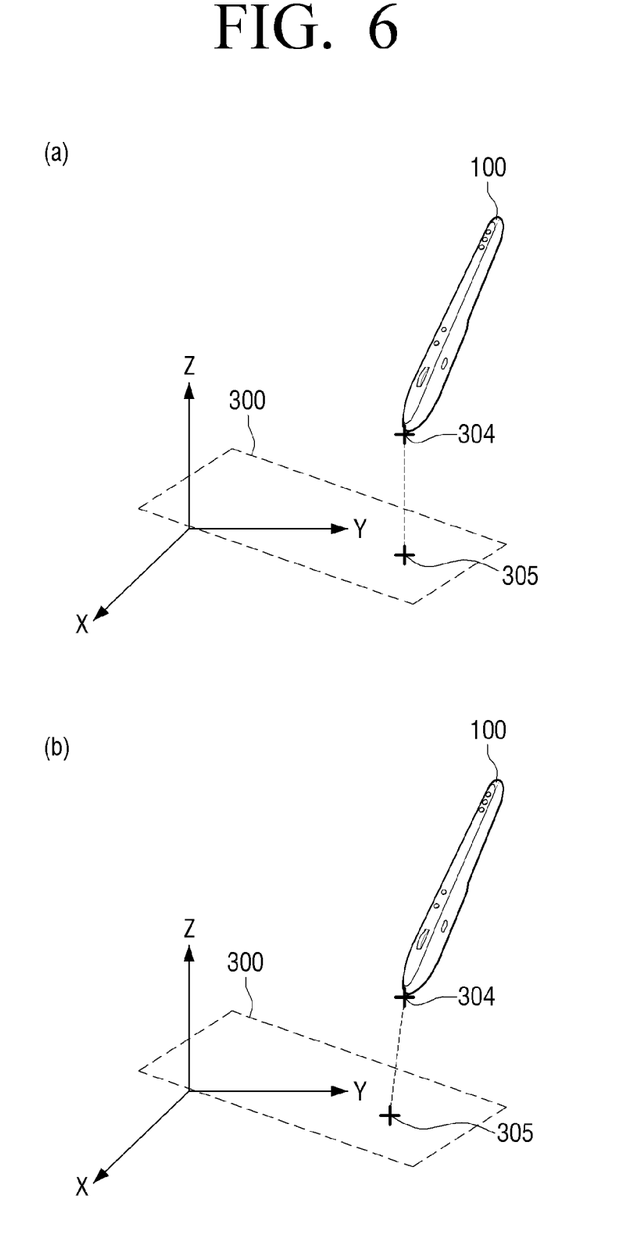

FIG. 6 illustrates a process of projecting location information of an input apparatus onto a defined virtual input region according to an embodiment of the present disclosure. Referring to FIG. 6 part (a), location information (x1, y1, z1) 304 calculated at a current location of an input apparatus 100 is not the same as location information in a virtual input region 300. In this case, the control unit 140 of FIG. 2 may calculate a z-coordinate of location information in a virtual input region 300, the x and y coordinates of which are 'x1' and 'y1', based on the location information (x1, y1, z1) 304 calculated at the current location of the input apparatus 100, as illustrated in FIG. 6 part (a). Thus, the control unit 140 may calculate location information (x1, y1, z2) 305 by projecting the location information (x1, y1, z1) 304 calculated at the current location of the input apparatus 100 onto the virtual input region 300.

Referring to FIG. 6 part (b), location information (x1, y1, z1) 304 calculated at current location of the input apparatus 100 is not the same as location information in the virtual input region 300. In this case, the control unit 140 may calculate location information (x2, y2, z2) 305 in the virtual input region 300, obtained when the location information (x1, y1, z1) 304 calculated at the current location of the input apparatus 100 is perpendicular to the virtual input region 300, as illustrated in FIG. 6 part (b).

The situations illustrated in FIG. 6 may occur when an input is performed using a virtual input region. These situations may be less likely to occur, for example, when the virtual input region is produced in a space having a fixed support, e.g., on a desk.

However, when a virtual input region is produced in a space having no fixed support, e.g., in an empty space, these situations are more likely to occur. In this case, a user may have difficulty in precisely locating the input apparatus in the virtual input region. In this case, the control unit 140 may calculate location information by projecting location information calculated at current location of the input apparatus 100 onto the virtual input region.

The display apparatus 200 may mark a mouse pointer on a screen region thereof corresponding to the location information calculated as described above with reference to FIG. 6.

The control unit 140 may include a central processing unit (CPU), a read-only memory (ROM) storing a control program, and a random access memory (RAM) used to memorize input data or used as a work-related memory region. The CPU, the ROM, and the RAM may be connected to one another via an internal bus.

Figure 7:
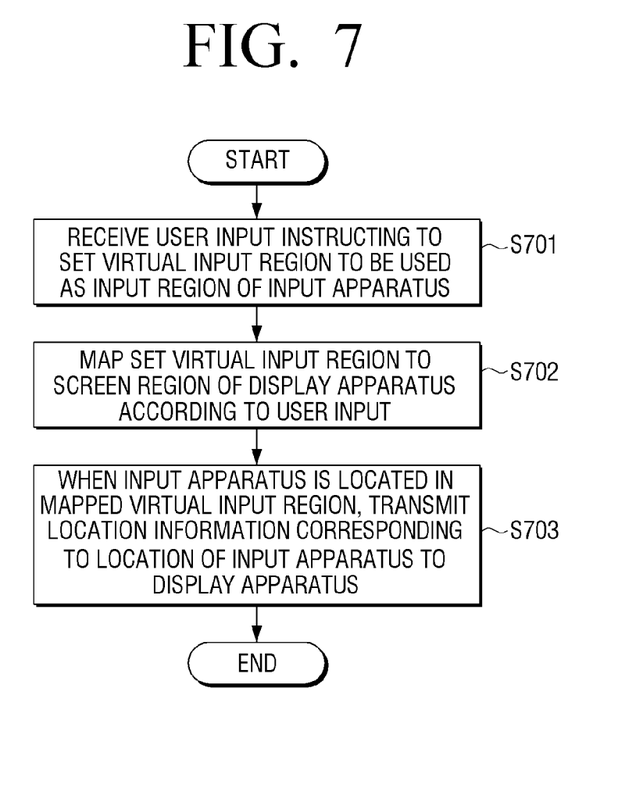
FIG. 7 is a flowchart illustrating an input controlling method of an input apparatus consistent with an exemplary embodiment of the present disclosure.

FIG. 7 is a flowchart illustrating an input controlling method of an input apparatus according to an embodiment of the present disclosure. Referring to FIG. 7, a user input instruction to define a virtual input region, which is to be used as an input region of the input apparatus, is received (operation S701). Here, the virtual input region may allow a pointer to be located on a display apparatus to correspond to the location of the input apparatus in the virtual input region. Also, the defined virtual input region may be a plane in a 3D space.

Then, the defined virtual input region and a screen region of the display apparatus are mapped to each other according to the user input (operation S702).

Here, the mapping of the defined virtual input region and the screen region of the display apparatus may be performed by the display apparatus, based on resolution information transmitted from the input apparatus to the display apparatus.

Otherwise, this mapping may be performed by the input apparatus. In this case, the input apparatus may compare information regarding a resolution of the display apparatus received from the display apparatus with information regarding a resolution of the defined virtual input region, calculate a ratio between the resolution of the display apparatus and the resolution of the defined virtual input region, and perform the mapping based on the calculated ratio.

Then, when the input apparatus is located in the mapped virtual input region, location information corresponding to the location of the input apparatus is transmitted to the display apparatus (operation S703).

In the input controlling method of FIG. 7 according to an embodiment of the present disclosure, the receiving of the user input (operation S701) may include receiving a first user input at a first point on the input apparatus, and receiving a second user input at a second point on the input apparatus that is diagonally opposite the first point. In this case, when the first and second user inputs are received, the input controlling method may further include defining a rectangular virtual input region with the first and second points as vertices.

Alternatively, in the input controlling method of FIG. 7 according to an embodiment of the present disclosure, the receiving of the user input may further include receiving a first user input instruction to change the mode of the input apparatus to a virtual input region defining mode, moving the input apparatus from a first point to a second point that is diagonally opposite the first point in the virtual input region defining mode, and receiving the first user input again at the second point. In this case, when the first user input is received again at the second point, the input controlling method may further include defining a rectangular virtual input region with the first and second points as vertices.

Also, the input controlling method of FIG. 7 according to an embodiment of the present disclosure may further include receiving a user input for controlling a resolution of the defined virtual input region.

Input controlling methods of an input apparatus according to various embodiments of the present disclosure can be embodied as program code, stored in any of various non-transitory computer readable media, and provided to servers or devices via any of the various non-transitory computer readable media.

The non-transitory computer readable media mean media capable of semi-permanently storing data, unlike capable of semi-permanently storing data unlike a medium capable of storing data only for a short time, such as a register, a cache, and a memory, and from which the data can be read by a device. In detail, various programs as described above may be stored in and provided via a non-transitory computer readable medium, e.g., a compact disc (CD), a digital versatile disc (DVD), a hard disk, a Blueray disc, a universal serial bus (USB), a memory card, or a read-only memory (ROM).

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An input apparatus for controlling a display apparatus, the input apparatus comprising:
   a communication unit;
   a sensing unit which senses movement of the input apparatus;
   a first input unit which receives a user input for defining a virtual input region of the input apparatus; and
   a control unit which controls the communication unit to transmit location information corresponding to a location of the input apparatus, to the display apparatus, to map the virtual input region to a screen region of the display apparatus.

2. The input apparatus of claim 1, wherein the virtual input region allows a pointer to be located on the display apparatus to correspond to the location of the input apparatus in the virtual input region.

3. The input apparatus of claim 1, wherein, when a first user input is received at a first point on the input apparatus via the first input unit and a second user input is received at a second point on the input apparatus, the control unit defines a virtual input region based on the first point and the second point.

4. The input apparatus of claim 1, wherein the control unit changes the mode of the input apparatus to a virtual input region defining mode when a first user input is received via the first input unit, and defines a virtual input region with a first point and a second point in the virtual input region defining mode when the input apparatus is moved from the first point to the second point and the first user input is then received again at the second point via the first input unit.

5. The input apparatus of claim 1, wherein
   the mapping of the virtual input region to the screen region of the display apparatus is performed by the display apparatus.

6. The input apparatus of claim 5, wherein the location information is the same as location information in the mapped virtual input region in which the input apparatus is located.

7. The input apparatus of claim 5, wherein the display apparatus displays a mouse pointer on the screen region of the display apparatus corresponding to the transmitted location information.

8. The input apparatus of claim 5, wherein the control unit controls the communication unit to transmit information regarding a resolution of the defined virtual input region to the display apparatus.

9. The input apparatus of claim 8, wherein the mapping of the virtual input region to the screen region of the display apparatus is performed based on the information regarding the resolution.

10. The input apparatus of claim 9, wherein
    the resolution of the defined virtual input region is increased for more precise movements of the input apparatus on the mapped screen region of the display apparatus, and
    the resolution of the defined virtual input region is decreased for less precise movements of the input apparatus on the mapped screen region of the display apparatus.

11. The input apparatus of claim 1, wherein the communication unit receives information regarding a resolution of the display apparatus from the display apparatus, and
    the control unit compares the information regarding the resolution of the display apparatus with information regarding a resolution of the defined virtual input region, calculates a ratio between the resolution of the display apparatus and the resolution of the defined virtual input region, and performs the mapping of the virtual input region to the screen region of the display apparatus, based on the calculated ratio.

12. The input apparatus of claim 11, wherein the location information is the same as location information in the screen region of the display apparatus, which is mapped to the location information regarding the location of the input apparatus.

13. The input apparatus of claim 1, wherein the defined virtual input region is a plane in a three-dimensional space.

14. The input apparatus of claim 1, further comprising a second input unit via which a user input instruction to adjust a resolution of the defined virtual input region is received.

15. The input apparatus of claim 1, wherein
    the sensing unit comprises a sensor to provide the location information of the input apparatus.

16. The input apparatus of claim 1, wherein the input apparatus is provided in the form of an electronic pen mouse.

17. An input controlling method of an input apparatus for a display apparatus, the method comprising:
    receiving a user input instruction to define a virtual input region of the input apparatus; and
    transmitting location information, corresponding to a location of the input apparatus, to the display apparatus, to map the virtual input region to a screen region of the display apparatus.

18. The method of claim 17, wherein the virtual input region allows a pointer to be located on the display apparatus to correspond to the location of the input apparatus in the virtual input region.

19. The method of claim 17, wherein the receiving of the user input comprises:
    receiving a first user input at a first point on the input apparatus; and
    receiving a second user input at a second point on the input apparatus, and
    wherein, when the first and second user inputs are received, the method further comprises defining a virtual input region based on the first and second points.

20. The method of claim 17, wherein the receiving of the user input comprises:
    receiving a first user input instruction to define the input apparatus in a virtual input region defining mode; and
    after the input apparatus is moved from a first point to a second point in the virtual input region defining mode, receiving the first user input again at the second point via an input unit, and
    when the first user input is received again at the second point via the input unit, the method further comprises defining a virtual input region based on the first and second points.

21. The method of claim 17,
    wherein the mapping of the virtual input region to the screen region of the display apparatus is performed by the display apparatus.

22. The method of claim 21, wherein the location information is the same as location information in the mapped virtual input region in which the input apparatus is located.

23. The method of claim 21, further comprising:
displaying, by the display apparatus, a mouse pointer on the screen region of the display apparatus corresponding to the transmitted location information.

24. The method of claim 21, further comprising:
transmitting information regarding a resolution of the defined virtual input region to the display apparatus.

25. The method of claim 24, wherein the mapping of the virtual input region to the screen region of the display apparatus is performed based on the information regarding the resolution.

26. The method of claim 25, further comprising:
increasing the resolution of the defined virtual input region for more precise movements of the input apparatus on the mapped screen region of the display apparatus, and decreasing the resolution of the defined virtual input region for less precise movements of the input apparatus on the mapped screen region of the display apparatus.

27. The method of claim 17, further comprising:
receiving information regarding a resolution of the display apparatus from the display apparatus;
comparing the information regarding the resolution of the display apparatus with information regarding a resolution of the defined virtual input region; and
calculating a ratio between the resolution of the display apparatus and the resolution of the defined virtual input region;
wherein the mapping of the virtual input region to the screen region of the display apparatus is performed by the input apparatus, based on the calculated ratio.

28. The method of claim 27, wherein the location information is the same as location information in the screen region of the display apparatus, which is mapped to the location information regarding the location of the input apparatus.

29. The method of claim 17, wherein the defined virtual input region is a plane in a three-dimensional space.

30. The method of claim 17, further comprising receiving a user input instruction to adjust a resolution of the defined virtual input region.

31. The method of claim 17, further comprising:
determining, by a sensor of the input apparatus, the location of the input apparatus.

32. The method of claim 17, wherein the input apparatus is provided in the form of an electronic pen mouse.

* * * * *

UNITED STATES PATENT AND TRADEMARK OFFICE
CERTIFICATE OF CORRECTION

PATENT NO.        : 9,195,322 B2                                    Page 1 of 1
APPLICATION NO.   : 14/066854
DATED             : November 24, 2015
INVENTOR(S)       : Ho-seong Jeong

It is certified that error appears in the above-identified patent and that said Letters Patent is hereby corrected as shown below:

In the claims,

Claim 1, Column 15, Line 19

Delete "information" and insert -- information, -- therefor.

Signed and Sealed this
Seventh Day of June, 2016

Michelle K. Lee
*Director of the United States Patent and Trademark Office*